US012131341B2

(12) United States Patent
Burton et al.

(10) Patent No.: US 12,131,341 B2
(45) Date of Patent: Oct. 29, 2024

(54) REPUTATION MANAGEMENT AND MACHINE LEARNING SYSTEMS AND PROCESSES

(71) Applicants: Sontiq, Inc., Nottingham, MD (US); NuArca, LLC, Woburn, MA (US)

(72) Inventors: Terri L. Burton, Forest Hill, MD (US); Rochelle F. Blease, Warren, RI (US); Brian J. Longe, Naples, FL (US); Todd R. Cooper, Manchester, MA (US); J. B. Sloan, West Newton, MA (US); Kellie N. Gable, Pasadena, MD (US)

(73) Assignees: SONTIQ, INC., Nottingham, MD (US); NUARCA, LLC, Nottingham, MD (US)

( * ) Notice: Subject to any disclaimer, the term of this patent is extended or adjusted under 35 U.S.C. 154(b) by 0 days.

(21) Appl. No.: 17/179,336

(22) Filed: Feb. 18, 2021

(65) Prior Publication Data

US 2022/0261821 A1 Aug. 18, 2022

(51) Int. Cl.
*G06Q 30/0201* (2023.01)
*G06F 40/205* (2020.01)
*G06F 40/30* (2020.01)
*G06N 5/04* (2023.01)
*G06N 20/00* (2019.01)
*G06Q 50/00* (2024.01)

(52) U.S. Cl.
CPC ....... *G06Q 30/0201* (2013.01); *G06F 40/205* (2020.01); *G06F 40/30* (2020.01); *G06N 5/04* (2013.01); *G06N 20/00* (2019.01); *G06Q 50/01* (2013.01)

(58) Field of Classification Search
CPC .... G06Q 30/0201; G06Q 50/01; G06N 20/00; G06N 5/04; G06F 40/205; G06F 40/30
USPC ........................................................ 705/7.29
See application file for complete search history.

(56) References Cited

U.S. PATENT DOCUMENTS

| | | | |
|---|---|---|---|
| 9,721,296 B1 * | 8/2017 | Chrapko | G06N 20/00 |
| 10,462,086 B2 * | 10/2019 | Akavaram | G06Q 10/107 |
| 10,735,401 B2 * | 8/2020 | Lonas | B66B 7/025 |
| 10,740,375 B2 * | 8/2020 | Jain | G06F 16/3344 |
| 11,205,147 B1 * | 12/2021 | Anderson | G06Q 10/06393 |
| 2005/0259546 A1 * | 11/2005 | Basile | G11B 20/00579 |
| | | | 369/47.12 |
| 2012/0035947 A1 * | 2/2012 | Coyne | G06Q 40/08 |
| | | | 705/2 |

(Continued)

OTHER PUBLICATIONS

Lisa Trottier Brown "The effects of dyad reading and text difficulty on third-graders' reading achievement" The Journal of Educational Research, ISSN: 0022-0671 (Print) 1940-0675 (Online) Journal homepage: http://www.tandfonline.com/loi/vjer20, 2016 (Year: 2016).*

(Continued)

*Primary Examiner* — Abdallah A El-Hage Hassan
(74) *Attorney, Agent, or Firm* — Sterne, Kessler, Goldstein & Fox P.L.L.C.

(57) ABSTRACT

Machine learning modeling within a special purpose hardware platform to determine an entity's public reputation based on entity-driven content and third-party content. The enclosed examples address a computer-centric and Internet-centric problem of a content provider system management to perfect a public persona to maximize brand valuation.

20 Claims, 7 Drawing Sheets

(56) References Cited

U.S. PATENT DOCUMENTS

| | | | |
|---|---|---|---|
| 2014/0258305 A1* | 9/2014 | Kapadia | H04W 4/21 |
| | | | 707/741 |
| 2014/0289160 A1* | 9/2014 | Stovall | G06Q 30/0282 |
| | | | 705/347 |
| 2017/0109838 A1 | 4/2017 | Byron et al. | |
| 2018/0276295 A1* | 9/2018 | Abou Mahmoud | G06F 40/30 |
| 2020/0151278 A1* | 5/2020 | Seida | G06F 16/9535 |
| 2021/0009381 A1 | 1/2021 | Lonas, Jr. | |
| 2021/0049624 A1* | 2/2021 | Nepomuceno | G06Q 30/0203 |

OTHER PUBLICATIONS

International Search Report and Written Opinion in International Application No. PCT/US2022/016884, mailed Jun. 3, 2022.
Mahmood Saba et al: "Reputation-Based Approach Toward Web Content Credibility Analysis", IEEE Access, vol. 7, Oct. 8, 2019 (Oct. 8, 2019), pp. 139957-139969, XP011748920, DOI: 10.1109/ACCESS.2019.2943747.
Pujianto Utomo et al: "Text Difficulty Classification Based on Lexile Levels Using K-Means Clustering and Multinomial Naive Bayes", 2019 International Seminar on Application for Technology of Information and Communication (ISEMANTIC), IEEE, Sep. 21, 2019 (Sep. 21, 2019), pp. 163-170, XP033651007, DOI: 10.1109/ISEMANTIC.2019.8884317.
Supplementary European Search Report for EP Application No. EP 22756971, mailed on Jun. 14, 2024, 12 pages.

* cited by examiner

REPUTATION MANAGEMENT AND MACHINE LEARNING SYSTEMS AND PROCESSES

BACKGROUND

Public entities, whose overall value may be affected by the sway of public perception, often require the management and monitoring of their reputations. This may include, for example, businesses professionals, corporate executives, professional athletes, political figures, and other public figures. Reputation management may include, for example, the influencing and/or control of an individual's or business's (collectively referred to as an "entity") reputation.

Influence or control may be exerted by first monitoring the reputation of the entity, addressing content which is potentially damaging to the entity, and using customer feedback solutions to get feedback or early warning signals to public repudiation. Most of reputation management is focused on pushing down negative Internet based search results using search engine optimization (SEO), management of online reviews and comments, and petitioning comments, reviews, and content under the Digital Millennium Copyright Act. Reputation management may attempt to bridge the gap between how a company perceives itself and how others view the company.

User-driven content is one of the most powerful forces in affecting the online reputation of an entity and buying decisions of its prospective customers. Key decision makers have taken notice of this fact and are investing in the proper tools to protect their corporate and personal online reputation.

Examples of an online reputation management system includes websites that have one-way or two-way feedback systems or post customer reviews of products or services. Major internet search engine websites and their results are also a primary target of reputation management efforts. Some of the tactics used by reputation management firms include the following: improving the keyword tagging and search engine optimization of company-published materials and website pages, in order to push down negative content; publishing original, positive content in websites and social media profiles, with the aim of outperforming negative results in a search. Submitting articles and press releases to authoritative websites in order to promote brand presence and suppress negative content; submitting legal take-down requests if someone believes they have been libeled or has experienced trademark or copyright infringement; obtaining mentions for a business or individual in third-party sites that rank highly on major search websites, directories, and search engines; and proactively responding to public criticism stemming from recent changes. Less than scrupulous methods may also be applied to boost online reputations including: censoring negative complaints or using SEO tactics to game the system and influence results; creating fake blog posts pretending to be a different person with that of a different online persona that shares the same name in order to push down negative search results on the actual person or brand; using spam bots and denial-of-service attacks to force sites with damaging content off the web entirely; masking the sponsors of a message or organization (e.g., political, advertising, religious or public relations) to make it appear as though it originates from and is supported by grassroots participant(s); and proactively offering free products to prominent reviewers.

While there are many tools and software solutions for reputation monitoring, these tools and solutions fail to aggregate user-driven content into a content type to perform unique evaluations based on the content type to make recommendations to the entity to improve the reputation in real-time.

DETAILED DESCRIPTION

Figure 1:
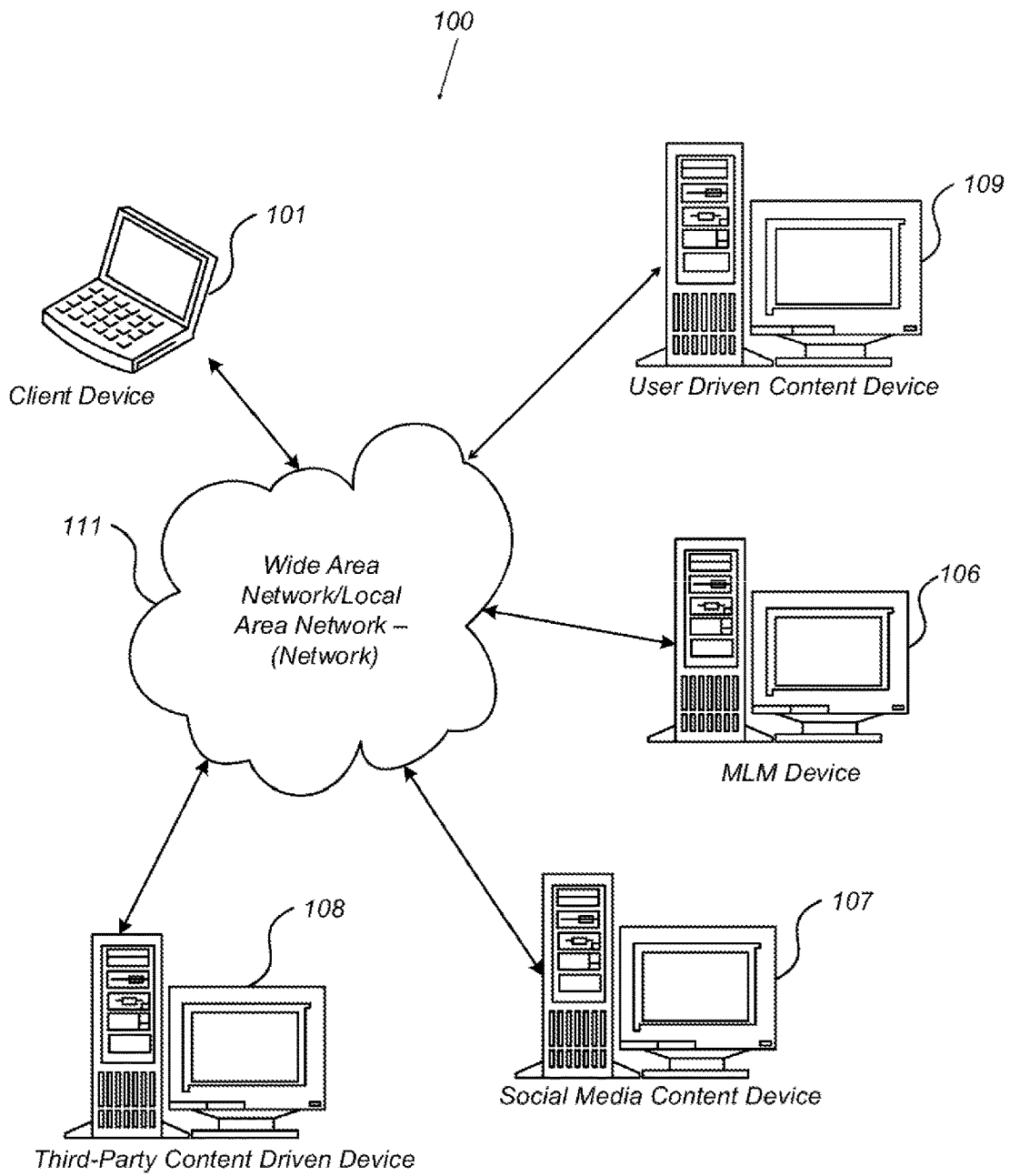
FIG. 1 illustrates an example multi-media platform system in which certain examples of the present disclosure may be implemented.

Examples described herein are configured to perform dynamic machine learning modeling techniques within a special purpose hardware platform to determine an entity's public reputation based on an aggregate of its user-driven content and third-part driven content. The disclosed examples and principles address a computer-centric and Internet-centric problem of a service provider system management to perfect a public persona to maximize brand valuation. The disclosed methods and system may be implemented as computer programs or application software on one or more computing devices that process user features collected by a data management system.

The machine learning model is operable to identify an at-risk reputation score. The model is operable to determine a model-target score and attributes and compare the at-risk reputation score to the model-target score and attributes. The model may do so in a tailored way for distinct segments of an overall user base. The machine learning model does not simply identify broad based behavioral trends; instead, the machine learning model allows a personalized assessment of the entity in real-time. For example, the machine learning model may retrieve user-driven content posted on social media platform provider systems, entity-related content on news sites and third-party content driven platforms, and other user-driven content platforms (e.g., videos, articles, corporate sites, school sites, etc.) to determine the at-risk reputation score in real-time.

Thus, the machine learning model makes use of sequential behavior rather than a traditional aggregate approach. That is, the sequential nature of events is an inherent part of the machine learning model, rather than an ad hoc approximation. The disclosed machine learning model may also take advantage of both dynamic data and input data (model-target score and attributes) to improve performance of a machine learning model by suggesting actions to resolve identification risk and achieve model-target score and attributes. Thus, taken together, the present disclosure is directed towards a novel personalized approach to modeling entities.

Attributes that contribute to the reputation score (i.e., the at-risk reputation score or the model target score) may include indices of trustworthy, interpersonal, professionalism, discretion, and engagement. Other indicators may be available to determining the attributes of the reputation score. Each indicator may be converted into a score using the metrics defined herein. The indicators may be predetermined by the entity or provided to the entity.

Machine learning is a field of study that gives computers the ability to learn without being explicitly programmed. Machine-learning explores the study and construction of algorithms, also referred to herein as tools, which learn from existing data and make predictions about new data. Such machine-learning tools operate by building a model from example training data to make data-driven predictions or decisions expressed as outputs or assessments (e.g., reputation score). Although example embodiments are presented with respect to a few machine-learning tools, the principles presented herein may be applied to other machine-learning tools.

In some example embodiments, the reputation score is a feature that can be incorporated into automated monitoring of the performance of reputation modeling platform or its components. The reputation score may also be available to human marketers and data scientists who might want to interact with the platform. However, it should be understood that some example embodiments operate automatically, absent such human interactions.

FIG. 1 illustrates an example multi-media platform system 100 in which certain example embodiments of the present disclosure may be implemented. The example multimedia platform system 100 includes a network 111, entity device 101, machine learning modeling (MLM) device 106, and social media content device 107, a third-party content driven device 108, and other user-driven content device 109 (collectively referred to as content provider devices 107-109).

The network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, enabling messages to be sent from one LAN to another. Furthermore, remote computers and other related electronic devices could be remotely connected to either LANs or WANs via a modem and temporary telephone link. Network 111 includes any communication method by which information may travel between computing devices.

The entity device 101 may include virtually any computing device that typically connects using a wired or wireless communications medium such as telephones, televisions, video recorders, cable boxes, gaming consoles, personal computers, multiprocessor systems, microprocessor-based or programmable consumer electronics, network PCs, or the like. The client device 101 may further be configured to include a client application that enables the user to log into a user account that may be managed by the service provider. Information provided either as part of user account generation, user account utilization, and or other activity may result in providing various user profile information. Such user profile information may include, but is not limited to, type of user and/or behavioral information about the user.

The MLM device 106 may include virtually any network computing device that is specially configured to determine reputation scores for each entity having related content from one of the content provider devices 107-109. Devices that may operate as MLM device 106 include, but are not limited to, personal computers, desktop computers, multiprocessor systems, microprocessor-based or programmable consumer electronics, network PCs, servers, network appliances, and the like.

Although MLM device 106 is illustrated as a distinct network device, the disclosed principles are not so limited. For example, a plurality of network devices may be configured to perform the operational aspects of MLM device 106. For example, data collection might be performed by one or more set of network devices, while processing the collected data to determine the abandonment risks may be performed by one or more other network devices.

Content provider devices 107-108 may include virtually any network computing device that is configured to provide to MLM device 106 information including entity information, and/or other content information, including, for example, social media posts, comments, and responses as well as relevant metadata about the account, etc. In some example embodiments, content provider devices 107-108 may provide various interfaces including, but not limited to, those described in more detail below in conjunction with FIG. 2.

Figure 2:
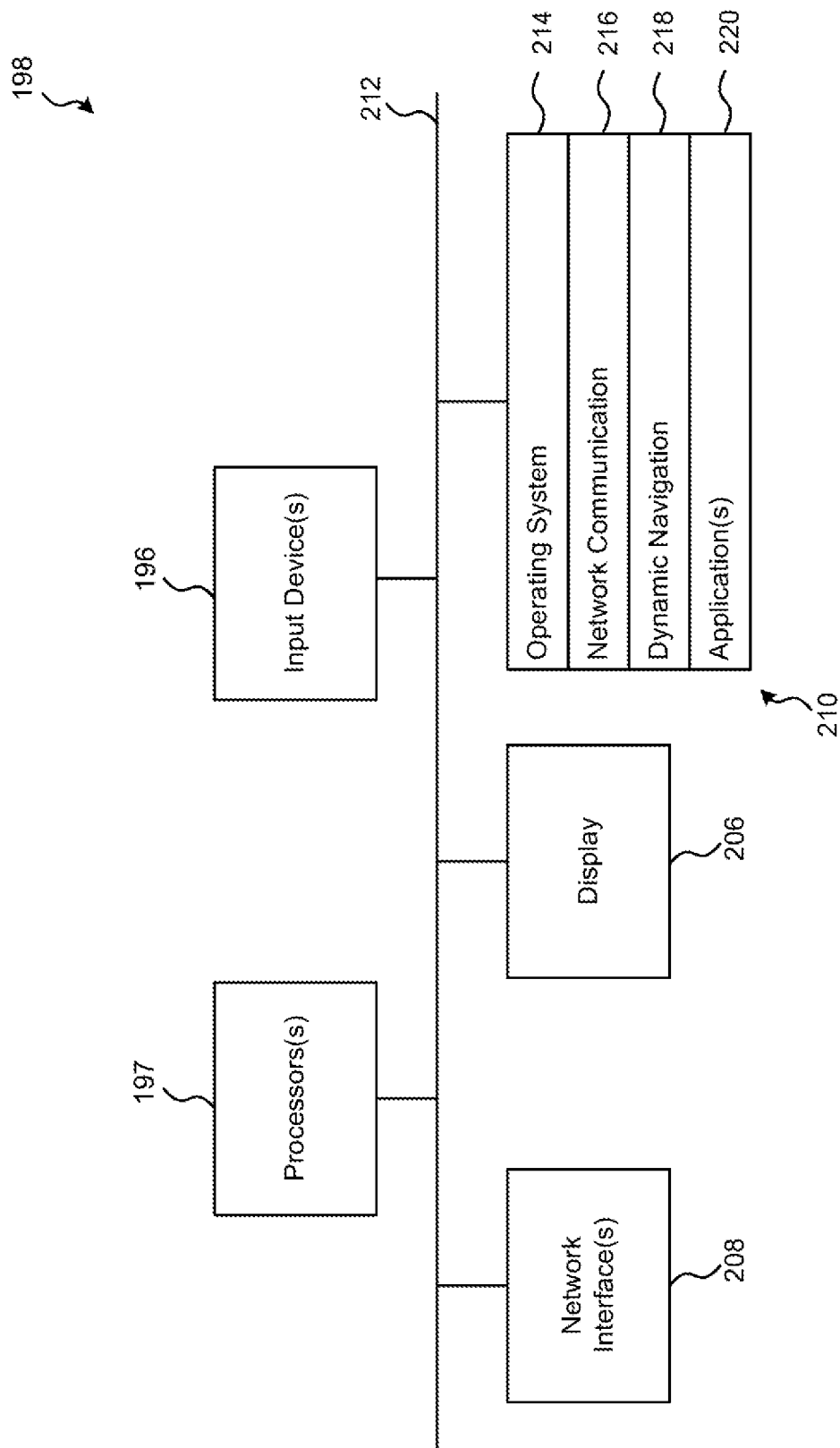
FIG. 2 is a block diagram of an example computing device that may implement various features and processes as described herein.

FIG. 2 is a block diagram of an example computing device 198 that may implement various features and processes as described herein. For example, computing device 198 may function as MLM device 106, content provider devices 107-108, or a portion or combination thereof in some embodiments. The computing device 198 may be implemented on any electronic device that runs software applications derived from compiled instructions, including without limitation personal computers, servers, smart phones, media players, electronic tablets, game consoles, email devices, etc. In some implementations, the computing device 198 may include one or more processors 197, one or more input devices 196, one or more display devices 206, one or more network interfaces 208, and one or more computer-readable media 210. Each of these components may be coupled by a bus 212.

Display device 206 may be any known display technology, including but not limited to display devices using Liquid Crystal Display (LCD) or Light Emitting Diode (LED) technology. Processor(s) 197 may use any known processor technology, including but not limited to graphics processors and multi-core processors. Input device 196 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, USB, Serial ATA or FireWire. Computer-readable medium 210 may be any medium that participates in providing instructions to processor(s) 197 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 2; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Dynamic navigation instructions 218 may include instructions that perform the process for providing dynamic and deep navigation of web pages using keyboard navigation as described herein. Application(s) may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a backend component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Throughout this specification, the term "platform" may be a combination of software and hardware components to provide ongoing management of a shaped online reputation. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and examples may be found in the following description.

Figure 3:
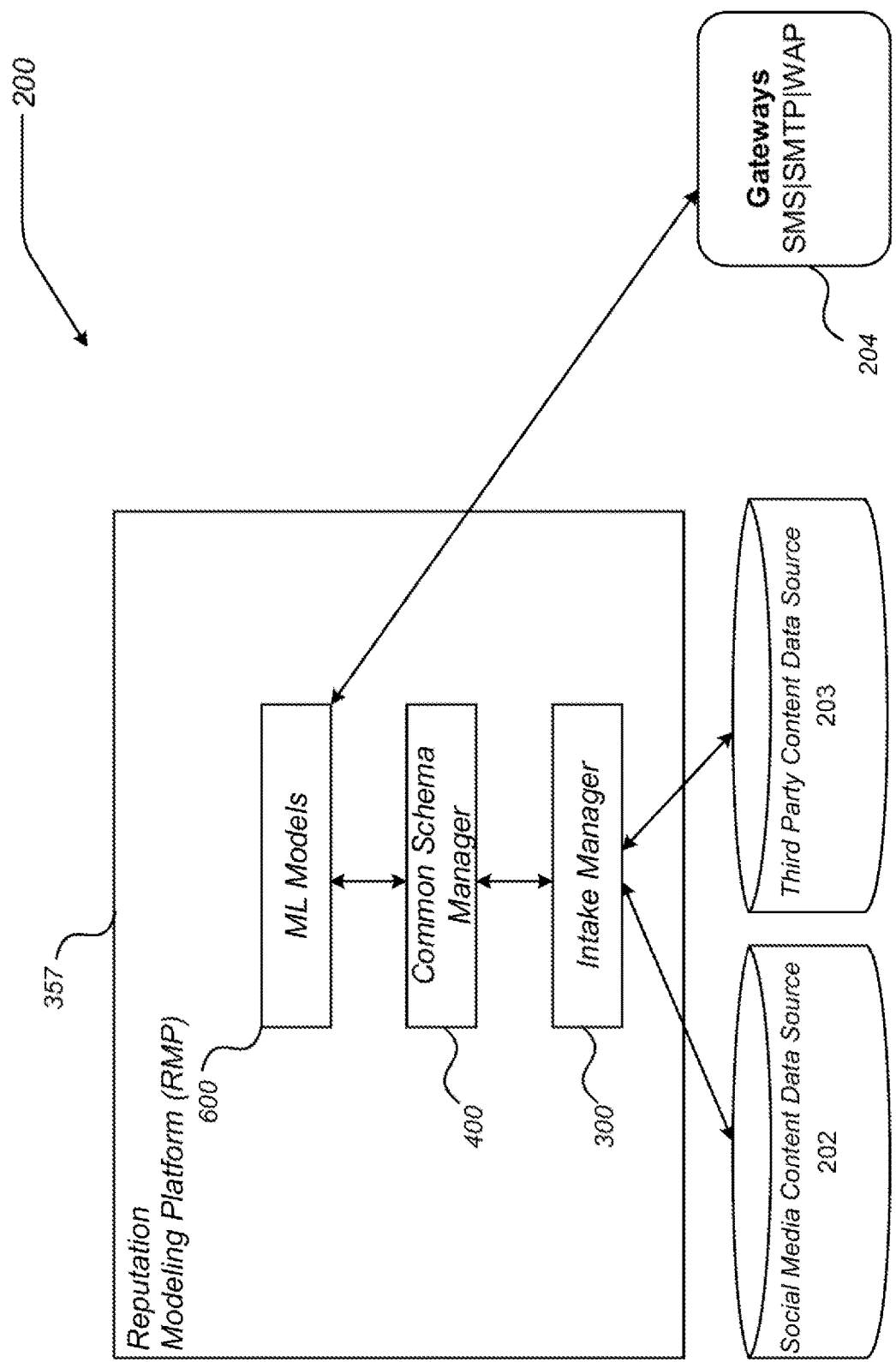
FIG. 3 shows one example architecture that may be useable to determine a reputation score, in accordance with an example of the disclosure.

FIG. 3 shows one example architecture 200 that may be used to determine a reputation score in accordance with the disclosed principles. Architecture 200 of FIG. 3 may include many more components than those shown. The components shown, however, are sufficient to disclose an illustrative example for practicing the disclosed principles. Architecture 200 may be deployed across components of FIG. 1, including, for example, the MLM device 106, the client device 101, and/or the content provider devices 107-108.

The architecture 200 includes a reputation modeling platform (RMP) 357, a user-driven content data source 202, and a third-party driven content data source 203. The RMP 357 also includes Machine Learning (ML) Models 600. Briefly, the ML Models 600 are employed to determine a reputation score of each entity.

Not all the components shown in FIG. 2 may be required to practice the example embodiments disclosed herein and variations in the arrangement and type of the components may be made without departing from the spirit or scope of the subject disclosure. As shown, however, architecture 200 further includes communication channel or communication gateways 204.

Although the user-driven content data source 202 and the third-party driven content data source 203 are illustrated as distinct storage devices, the disclosed principles are not so limited. For example, one or a plurality of storage devices may be configured to perform the operational aspects of the user-driven content data source 202 and the historical data source 203. For example, data collection might be performed by one or more set of storage devices.

The user-driven content data source 202 may be implemented within one or more content provider devices 107-108 of FIG. 1. The user-driven content data source 202 may be configured to store data such as social media posts, comments, and responses as well as relevant metadata related to the entity's account on the social media content device 107. The social media content device 107 includes an API that allows access the content including all text posted as well as attributes of the account. The user-driven content data source 202 may include these attributes, such as, for example, the date the account was created, the number of people the entity is connected to or following and how often the entity interacts with other users.

The user-driven content data source 202 may also include the entity's own authored and published content. For example, the user-driven content data source 202 may include videos, articles, corporate sites, and school sites, generated by the entity and published online. It should be understood that the entity's own authored and published content may or may not be published on the social media content device 107. Rather, the entity's own authored and published content may be published on the entity's own website and/or on third-party websites.

The RMP 357 may also receive data from the third-party driven content data source 203. The third-party driven content data source 203 may include virtually any mechanism usable for storing and managing data including, but not limited to, files stored on a disk or other computer readable medium, an application, such as a database or spreadsheet, a web service, or the like. The third-party driven content data source 203 may receive and store, but is not limited to storing, any content related to the entity that is not user-driven content. For example, the third-party driven content data source 203 may store publicly available information about the entity, including identifiers, demographic information, articles, personal commentary, or the like.

RMP 357 is streamlined to quickly receive and process the incoming data through various data cycles. For example, the RMP 357 may generate a reputation score from more than one machine learning models based on data received from the user-driven content data source 202 and the third-party driven content data source 203. As the raw data is processed into state vectors of attributes, treatment eligibilities, ranking models, distribution data, and other supporting data, the raw data, and/or results of the processing of the raw data may be stored for later use.

Communication channels 204 may include one or more components that are configured to enable network devices to deliver and receive interactive communications with one or more users. In one example embodiment, communication channels 204 may be implemented within one or more of content provider devices 107-108, client device 101 and/or within networks 111 of FIG. 1.

As discussed above, RMP 357 is configured to receive social media data from the user-driven content data source 202. RMP 357 may employ intake manager 300 to parse and/or store the incoming data. One example of an intake manager 300 is described in more detail below in conjunction with FIG. 4. The data may then be provided to common schema manager 400, which may compute various additional attributes, manage updates to state vectors for entities within the system, and to further map raw data into a common schema. The common schema data may then be used to support a number of models, including ML Models 600. ML Models 600 are configured to generate reputation scores and indices that are then provided to common schema manager 400 to become part of the common schema data.

In some instances, it may also be possible to provide the raw data directly to the ML Models 600. This may be desirable when specific content that is not captured by the common schema nevertheless proves to be of high value for ML Models 600 or is otherwise useful in the operation of the RMP 357. This is discussed in greater detail below with respect to FIG. 4.

It should be noted that the components shown in RMP 357 of FIG. 3 are configured to execute as multiple asynchronous and independent processes, coordinated through an interchange of data at various points within the process. As such, it should be understood that the intake manager 300 and the common schema manager 400 may operate within separate network devices, such as multiple network devices, within the same network device within separate CPUs, within a cluster computing architecture, a master/slave architecture, or the like. In at least one example embodiment, the selected computing architecture may be specially configured to optimize a performance of the manager executing within it. Moreover, it should be noted that while the intake manager 300 and the common schema manager 400 are described as processes, one or more of the sub-processes within any of the managers 300 and 400 may be fully implemented within hardware or executed within an application-specific integrated circuit (ASIC), that is, an integrated circuit that is customized for a particular task.

Figure 4:
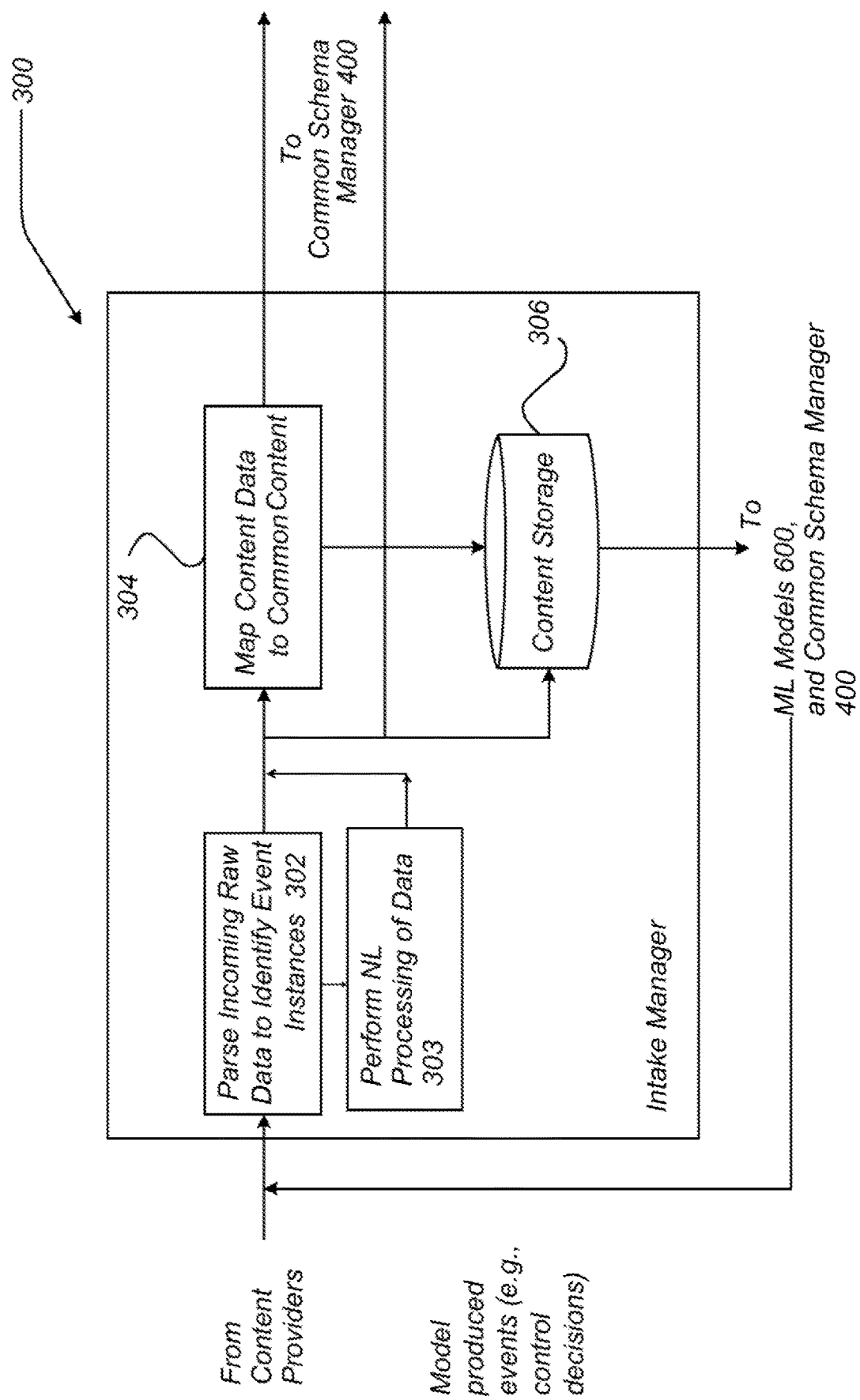
FIG. 4 shows one example of an intake manager (IM), configured to provide a framework for accessing raw or model produced data files, in accordance with an example of the disclosure.

FIG. 4 shows one example of an intake manager (IM) 300 configured to provide a framework for accessing raw data files that may include user-driven content data for entity. The IM 300 may receive data as described above at a specified interval to produce a real-time model and to generate the reputation score. In some example embodiments, data may be received daily, hourly, or even in real time to generate the reputation score. IM 300 may employ a sub-process 302 to parse incoming user-driven content data into separate streams of text data to identify content data, and perform any copying of the files into various storage locations and registries, such as content storage 306. Parsing may include, among other actions, separating posts into original posts and comments and responses.

IM 300 may also employ a sub-process 303 to perform natural language processing of the parsed incoming user-driven content data to perform metrics on the content data and any copying of the files into various storage locations and registries, such as content storage 306. For example, the parsed incoming user-driven content data may be analyzed for its lexile-level to determine if the author is writing at, for example, a second grade level, a college level, or another level in between. The parsed incoming user-driven content data may also be analyzed to determine the length and volume of interactions. For example, the number of posts, the length of the posts, the number of views or reads a post receives, etc. may be determined after parsing the incoming user-driven content data. Furthermore, the parsed incoming user-driven content data may be classified. For example, the the parsed incoming user-driven content data may be determined to be related to professional topics, sports, media, politics, academia, etc. Finally, the sentiment of the parsed incoming user-driven content data may be determined. For example, it may be determined that a post or a response is generally positive or generally negative.

The data may then be provided to sub-process 304, where various content may be identified and mapped to common content. For example, sub-process 304 may examine the incoming content, and so forth, to generate common content with common terminology, form, formats, and so forth, to be content-provider agnostic.

Figure 5:
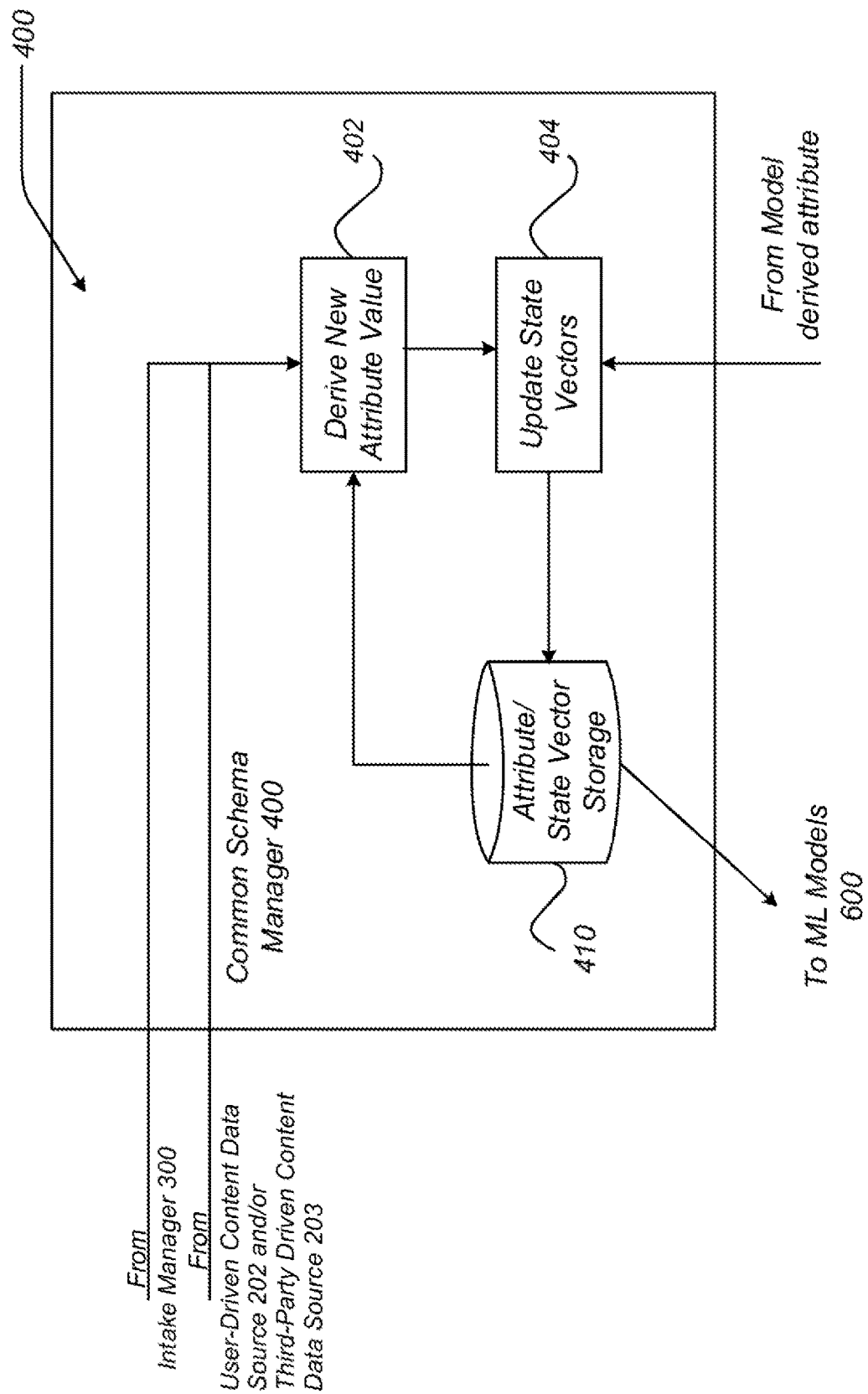
FIG. 5 shows one example of a Common Schema Manager (CSM) usable within the reputation modeling platform (RMP) of FIG. 2, in accordance with an example of the disclosure.

FIG. 5 shows one example of a Common Schema Manager (CSM) 400 that may be used within the RMP 357 of FIG. 2. It should be noted that CSM 400 may include more or less components than those shown in the figure. However, those components shown are sufficient to practice the disclosed innovations.

As shown in FIG. 5, the CSM 400 receives data from IM 300 at sub-process 402, where the derived attributes may be computed and provided to sub-process 404 to fill and/or update state vectors for entities in attribute/state vector storage 410. Alternatively, or in addition to, the CSM 400 receives data from the user-driven content data source 202 and/or the third-party driven content data source 203. The sub-process 402 may compute a variety of quantitative attributes, including, but not limited to, trustworthy, interpersonal, professional, discretion, engaging, etc. Other quantitative attributes may also be considered. When factor analysis (a statistical technique) is applied to personality survey data, it reveals semantic associations: some words used to describe aspects of personality are often applied to the same person. For example, someone described as conscientious is more likely to be described as "always prepared" rather than "messy". These associations suggest five broad dimensions used in common language to describe the human personality and psyche. Table 1 below exemplify additional computed attributes.

TABLE 1

| | | |
|---|---|---|
| Openness | Self-Discipline | Modesty |
| Adventurousness | Self-Efficacy | Sympathy |
| Artistic Interests | Extroversion | Trust |
| Emotionality | Activity Level | Neuroticism |
| Imagination | Assertiveness | Anxiety |
| Intellect | Cheerfulness | Anger |
| Liberalism | Excitement Seeking | Depression |
| Conscientiousness | Friendliness | Immoderation |
| Achievement Striving | Gregariousness | Self-Consciousness |
| Cautiousness | Agreeableness | Vulnerability |
| Dutifulness | Altruism | |
| Orderliness | Cooperation | |

The attributes may be calculated based on predetermined metrics performed in sub-process 303. For example, the trustworthy indicator may be calculated based on the following metrics: lexile level 15%, reputation of responses 30%, sentiment of posts/responses 30%, text classification (professional/academic posts) 25%. A score for trustworthiness may be generated based on an accounting of this weighting. Table 2 below illustrates the calculation for the additional attributes.

TABLE 2

| Attribute | Metrics |
|---|---|
| Trustworthy | Lexile Level (15%) Reputation of responses (30%) Sentiment of posts/responses (30%) Text Classification - Professional/Academic posts (25%) |
| Interpersonal | Volume of interactions (35%) # of followers (30%) Reputation of responses (10%) Sentiment of posts/responses (25%) |

TABLE 2-continued

| Attribute | Metrics |
|---|---|
| Professionalism | Text Classification- Professional, Academic (30%) Lexile Level (30%) Sentiment of Posts/Responses (20%) Length of posts/responses (10%) |
| Discretion | Volume of Posts/Length of Posts (15%) Sentiment of Posts/Responses (40%) Text Classification - Professional/Academic Posts (30%) Text Classification - Politics/Social (10%) |
| Engagement | Text Classification - Multi-Topical (10%) Sentiment of Posts/Responses (30%) # of reads/views (40%) Reputation of responses (20%) |

In any event, the computed attributes may be used to update state vectors for e.g., an entity, which may be performed by sub-process 404. The updated state vectors may be extracted by sub-process 402 from the data stores and provided to sub-process 404. While shown within CSM 400, attribute/state vector storage 410 may reside in another location external to CSM 400. The attribute/state vector storage 410 is illustrated merely to show that data may be used and/or provided by different sub-processes of CSM 400. For example, among other things, content storage 306 and/or state vector storage 410 may provide various content data requirements used to provide data for initialization of an attribute or to derive attributes that might be computed, for example, from 'scratch', or the like.

Output of CSM 400 may flow, among other places, to ML Models 600 of FIG. 2, and conversely, those components may provide updated attribute information to sub-process 408 in order that it may be added to attribute/state vector storage 410.

As noted, ML Models 600 primarily (although not exclusively) receive content data after it has been mapped to the common schema 400. The data available in the content storage 306 or attribute/state vector storage 410 contains a wide range of information about the entity that can be used to create a contextual model.

One example of a contextual model disclosed herein is a dynamic state-space model realized within a machine learning method model framework. An example ML model includes a random forests, XGBoost, or random decision forests model used for classification, regression and other tasks. The random forests model operates by constructing a multitude of decision trees at training time and outputting the class that is the mode of the classes (classification) or mean prediction (regression) of the individual trees. A ML model is a model for producing sequences with certain statistical properties. This is discussed in greater detail below with respect to FIG. 6.

To determine if an entity's reputation score, a pre-defined template is constructed for an entity and evaluated with respect to the ML model to achieve a supreme prediction accuracy. For example, in order for the ML model to be compared to a template, several pre-defined templates may be created with appropriate ranges for predetermined attributes. In some examples, the pre-defined templates may be manually preloaded with values. In other examples, the pre-defined templates may be refined by analyzing batches of real world data samples from individuals who have achieved or are showing success in the appropriate profile.

Figure 6:
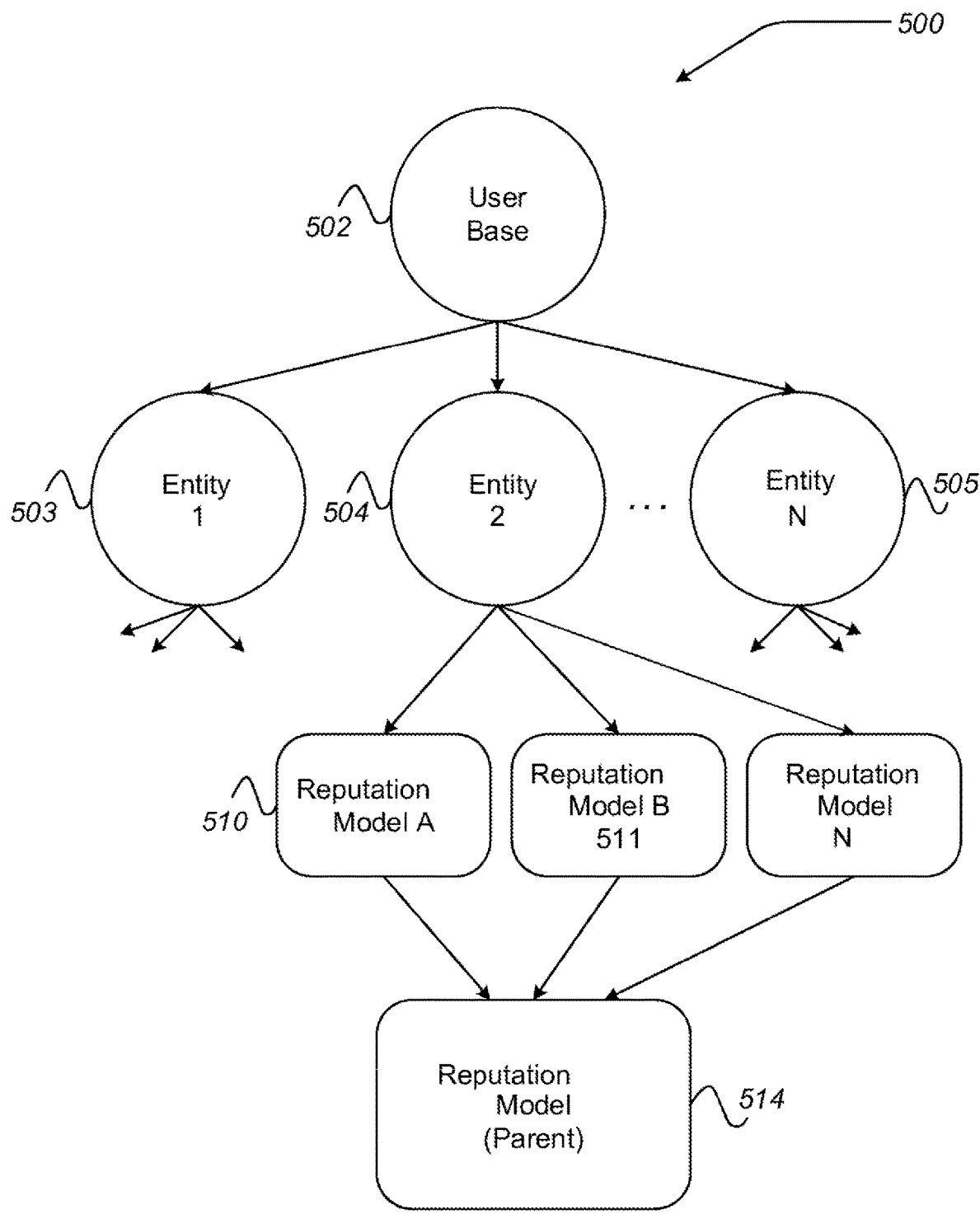
FIG. 6 illustrates one example of a machine learning model, in accordance with an example of the disclosure.

FIG. 6 illustrates one example of an ML model 500 generated for an entity 504 that is selected from user base 502. As shown, a reputation model A 510 and a reputation model B 511 may be generated for the entity 504. Similar ML models may also be generated for any or all other entities, that is, 503, 505, and others that have been omitted from FIG. 6 for clarity. There may be multiple ML models for any given entity of the user base because the ML model may be highly parameterized, for example, allowing for varying impacts of all different social media platforms, forums, news, etc. that requires a continuous assessment of where the largest impacts are found.

In some examples, the reputation model A 510 may be generated based on the 302 the parsed incoming user-driven content data. For example, the reputation model A 510 may be generated based on the original posts parsed from the incoming user-driven content data at sub-process 302. The reputation model B 511 may be generated for the entity 504 based on the comments and responses parsed from the incoming user-driven content data at sub-process 302. In this instance, multiple variants of the ML model may produce separate reputation scores for each entity (one per variant). While two variant reputation models are illustrated herein, it is conceivable that more than two variant ML models may be generated.

In some examples, the reputation model A 510 and the reputation model B 511 may be generated based on the content data mapped to the common schema related to the entity 504. In some examples, the reputation model A 510 and the reputation model B 511 may be compared to the pre-defined template [e.g., reputation model (parent) 514].

In such cases, a user would receive multiple reputation scores, one from each valiant. Moreover, it can be useful to run multiple variants of the ML model in production because there are multiple uses for its output, including, but not limited to automated decisioning, model performance monitoring, or the like. In any event, the ML hierarchy 500 may be used to enhance the core personality insights response and over time, make it more robust and tailored to the specific use case of analyzing social media data.

The content data associated with an entity is defined by a select set of attributes either drawn directly from the common schema or values derived from basic measurements in the common schema. The content data may be represented on an hourly interval, in one example, to provide a high resolution for which the full range of reported data is typically available. However, higher resolution (e.g. every 5 minutes) or lower resolution (e.g., bi-daily) representations could also be used.

Figure 7:
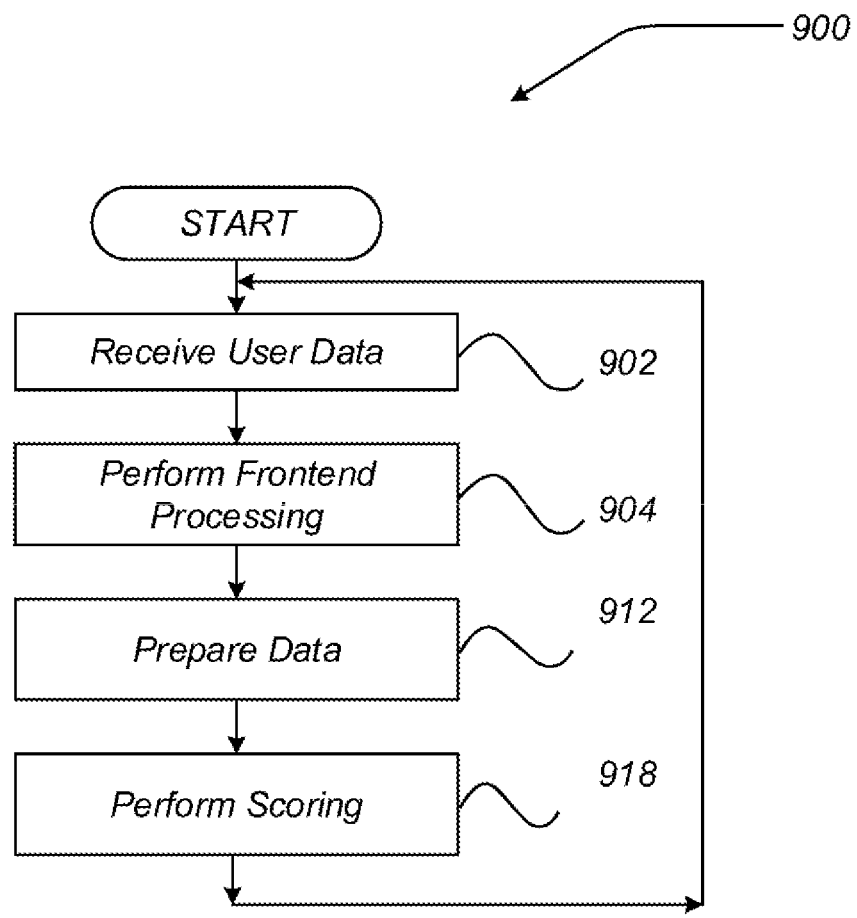
FIG. 7 shows one example of a process flow useable to train abandonment models, in accordance with an example of the disclosure.

The operation of certain aspects of the ML Models of FIG. 6 are now described with respect to the process 900 illustrated in FIG. 7, which may be used to determine the reputation score for an entity. The model results are then appended to the common schema.

Process 900 of FIG. 7 may be implemented within any one or more of the models 602-604 of FIG. 6, which operate within RMP 357 of FIG. 3.

Process 900 may begin at block 902, where entity data is received and or accessed. The entity data may be extracted from a representative set of a content provider's data set. In one example embodiment, the received data is raw data from the content provider's data set (though data may also be received from other sources).

At block 904, various frontend processing may be performed on the content data, including those actions discussed above in conjunction with FIG. 3-4, where the raw data may be parsed, and mapped to a common schema. Frontend processing may also include mapping a user to user base segments where the user base has been partitioned as described in conjunction with the description of FIG. 6.

Before performing training with the data, a number of data preparation steps may be performed at step 912. The same data preparation steps (including mapping content instances to common content at sub-process 304 or deriving new attribute value at sub-process 404) may be carried out for both model training and use of the model in operation.

Data preparation includes constructing content observations for the users and determining a reputation label for model training and (once enough time passes for it to become available) operational model performance monitoring. For model training and calibration, the prepared data may be split into independent sets for training, testing, and validation. The training set contains examples of pre-defined templates created with appropriate ranges for predetermined attributes.

The test set is used to get an unbiased estimate of model performance (since the training and validation sets were used to determine model settings). The ML model framework is employed to train the model. The training set is used to train reputation models. Process 900 continues at block 918, where scoring and classifying of content data for the user framework is performed. To test the model and use it in operation, it is necessary to have a method to score content data. Several approaches may be employed. Once the likelihood that a model produced a content data is computed, the reputation score is predicted based on the pre-defined templates may be created with appropriate ranges for predetermined attributes. The reputation score may be determined by computing the content data. The two values are compared.

It will be understood that each block of the processes, and combinations of blocks in the processes discussed above, can be implemented by computer program instructions. These program instructions may be provided to a processor to produce a machine, such that the instructions, which execute on the processor, create means for implementing the actions specified in the block or blocks. The computer program instructions may be executed by a processor to cause a series of operational steps to be performed by the processor to produce a computer-implemented process such that the instructions, which execute on the processor to provide steps for implementing the actions specified in the block or blocks. The computer program instructions may also cause at least some of the operational steps shown in the blocks to be performed in parallel. Moreover, some of the steps may also be performed across more than one processor, such as might arise in a multiprocessor computer system. In addition, one or more blocks or combinations of blocks in the illustration may also be performed concurrently with other blocks or combinations of blocks, or even in a different sequence than illustrated without departing from the scope or spirit of the subject innovation. Accordingly, blocks of the illustration support combinations of means for performing the specified actions, combinations of steps for performing the specified actions and program instruction means for performing the specified actions. It will also be understood that each block of the illustration, and combinations of blocks in the illustration, can be implemented by special purpose hardware-based systems, which perform the specified actions or steps, or combinations of special purpose hardware and computer instructions.

What is claimed is:

1. A computer-implemented method for determining an entity's public reputation, the method being performed on a computing device and executed by a processor, the method comprising:

receiving, from a first device, entity-driven content associated with an entity in a format associated with the first device;

receiving, from a second device, third-party content associated with the entity in a format associated with the second device;

transforming:
   the entity-driven content from the format associated with the first device to a common format based on semantic associations between attributes of the entity-driven content and predetermined attributes of a template-based reputation model, and
   the third-party content from the format associated with the second device to the common format based on semantic associations between attributes of the third-party content and the predetermined attributes of the template-based reputation model;

receiving a reputation model from a predictive model based on:
   the transformed entity-driven content in the common format and the transformed third-party content in the common format input to the predictive model,
   wherein the predictive model is a machine-learning model that has been pre-trained to generate the reputational model for the entity based on attributes of the entity-driven content and attributes of the third-party content, and wherein pre-training the predictive model comprises:
   extracting entity data from a content provider-specific dataset,
   generating, for the entity data, at least one of: state vectors of attributes, treatment eligibilities, or ranking models based on content observations for different entities indicated by the entity data,
   generating a training dataset based on the entity data and, and at least one of the state vectors of attributes, the treatment eligibilities, or the ranking models;
   training, using the training dataset, the predictive model to generate reputational models for the entity based on attributes of the entity-driven content and the attributes of the third-party content,
   validating an output of the predictive model using a validating dataset generated based on the entity data, and
   calibrating, based on the validated output of the predictive model, the predictive model to generate the reputational model for the entity based on attributes of the entity-driven content and attributes of the third-party content;

comparing values for the predetermined attributes of the template-based reputation model to values for attributes of the reputation model for the entity;

generating, based on the comparing the values for the predetermined attributes of the template-based reputation model to the values for the attributes for the reputational model for the entity, a reputation score for the entity; and sending, to a third device, an indication of the reputation score.

2. The computer-implemented method of claim 1, further comprising generating, based on a value of the reputation score for the entity, at least one instruction for increasing the reputation score.

3. The computer-implemented method of claim 2, further comprising parsing the entity-driven content to identify the attributes of the entity-driven content.

4. The computer-implemented method of claim 3, further comprising determining, based on the parsed entity-driven content, a lexile-level for at least a portion of the parsed entity-driven content, wherein an attribute of the attributes of the reputational model for the entity indicates the lexile-level.

5. The computer-implemented method of claim 3, wherein an attribute of the attributes of the reputational model for the entity indicates at least one of an amount of historical interactions between the entity and another entity, or a duration of an interaction associated with the entity.

6. The computer-implemented method of claim 3, further comprising updating the predetermined attributes of the template-based reputation model to include at least one of the reputation score or a portion of the reputational model for the entity.

7. The computer-implemented method of claim 3, wherein the parsing the entity-driven content to identify the attributes of the entity-driven content comprises determining a sentiment of the parsed data, wherein the sentient accounts for a predetermined metric in an attribute of the attributes of the entity-driven content, used to generate the reputation score.

8. The computer-implemented method of claim 1, wherein the entity-driven content comprises content extracted from at least one of social media content, entity-authored content, or entity-published content.

9. The computer-implemented method of claim 1, wherein an attribute of the attributes of the reputational model for the entity indicates a sentiment for the entity.

10. The computer-implemented method of claim 1, wherein the third device comprises at least one of a client device, a mobile device, or a smart device.

11. A system, comprising:
one or more memories;
at least one processor each coupled to at least one of the memories and configured to perform operations comprising:
   receiving, from a first device, entity-driven content associated with an entity in a format associated with the first device;
   receiving, from a second device, third-party content associated with the entity in a format associated with the second device;
   transforming:
      the entity-driven content from the format associated with the first device to a common format based on semantic associations between attributes of the entity-driven content and predetermined attributes of a template-based reputation model, and
      the third-party content from the format associated with the second device to the common format based on semantic associations between attributes of the third-party content and the predetermined attributes of the template-based reputation model;
   receiving a reputation model from a predictive model based on:
      the transformed entity-driven content in the common format and the transformed third-party content in the common format input to the predictive model,
      wherein the predictive model is a machine-learning model that has been pre-trained to generate the reputational model for the entity based on attributes of the entity-driven content and attributes of the third-party content, and wherein pre-training the predictive model comprises:
      extracting entity data from a content provider-specific dataset,
      generating, for the entity data, at least one of: state vectors of attributes, treatment eligibilities, or ranking models based on content observations for different entities indicated by the entity data, generating a training dataset based on the entity data and, and at least one of the state vectors of attributes, the treatment eligibilities, or the ranking models;

training, using the training dataset, the predictive model to generate reputational models for the entity based on attributes of the entity-driven content and the attributes of the third-party content, validating an output of the predictive model using a validating dataset generated based on the entity data, and calibrating, based on the validated output of the predictive model, the predictive model to generate the reputational model for the entity based on attributes of the entity-driven content and attributes of the third-party content;

comparing values for the predetermined attributes of the template-based reputation model to values for attributes of the reputation model for the entity;

generating, based on the comparing the values for the predetermined attributes of the template-based reputation model to the values for the attributes for the reputational model for the entity, a reputation score for the entity; and sending, to a third device, an indication of the reputation score.

12. The system of claim 11, the operations further comprising generating, based on a value of the reputation score for the entity, at least one instruction for increasing the reputation score.

13. The system of claim 12, the operations further comprising parsing the entity-driven content to identify the attributes of the entity-driven content.

14. The system of claim 13, the operations further comprising determining, based on the parsed entity-driven content, a lexile-level for at least a portion of the parsed entity-driven content, wherein an attribute of the attributes of the reputational model for the entity indicates the lexile-level.

15. The system of claim 13, wherein an attribute of the attributes of the reputational model for the entity indicates at least one of an amount of historical interactions between the entity and another entity, or a duration of an interaction associated with the entity.

16. The system of claim 13, the operations further comprising updating the predetermined attributes of the template-based reputation model to include at least one of the reputation score or a portion of the reputational model for the entity.

17. The system of claim 13, wherein the parsing the entity-driven content to identify the attributes of the entity-driven content comprises determining a sentiment of the parsed data, wherein the sentient accounts for a predetermined metric in an attribute of the attributes of the entity-driven content, used to generate the reputation score.

18. The system of claim 11, wherein the entity-driven content comprises content extracted from at least one of social media content, entity-authored content, or entity-published content.

19. The system of claim 11, wherein an attribute of the attributes of the reputational model for the entity indicates a sentiment for the entity.

20. The system of claim 11, wherein the third device comprises at least one of a client device, a mobile device, or a smart device.

* * * * *